United States Patent

Shelby et al.

[11] 4,097,093
[45] Jun. 27, 1978

[54] TRACK GUIDING MEANS FOR A TRACK-TYPE VEHICLE

[75] Inventors: Robert L. Shelby, Chillicothe; James T. Duke; Duane L. Parker, both of Peoria, all of Ill.

[73] Assignee: Caterpillar Tractor Co., Peoria, Ill.

[21] Appl. No.: 735,480

[22] Filed: Oct. 26, 1976

[51] Int. Cl.² .................................. B62D 55/16
[52] U.S. Cl. ............................ 305/22; 305/27; 305/28; 305/56
[58] Field of Search ................... 305/56, 22, 27, 28

[56] References Cited

U.S. PATENT DOCUMENTS

| 1,318,188 | 10/1919 | Tritton | 305/28 |
| 1,885,486 | 11/1932 | Smyth | 305/27 X |
| 2,418,610 | 12/1943 | Webb | 305/28 |
| 3,826,325 | 7/1974 | Purcell et al. | 305/22 X |

Primary Examiner—Robert B. Reeves
Assistant Examiner—John P. Shannon
Attorney, Agent, or Firm—Phillips, Moore, Weissenberger, Lempio & Majestic

[57] ABSTRACT

A guide arrangement for a track assembly of a track-type vehicle comprises a first arm mounted on a track frame, a second arm pivotally mounted on the first arm and a pair of rollers rotatably mounted on the second arm to engage the track assembly in rolling contact therewith. A pair of guides are secured to either the first or second arm to straddle each link assembly of the track assembly to restrain lateral movements thereof.

10 Claims, 8 Drawing Figures

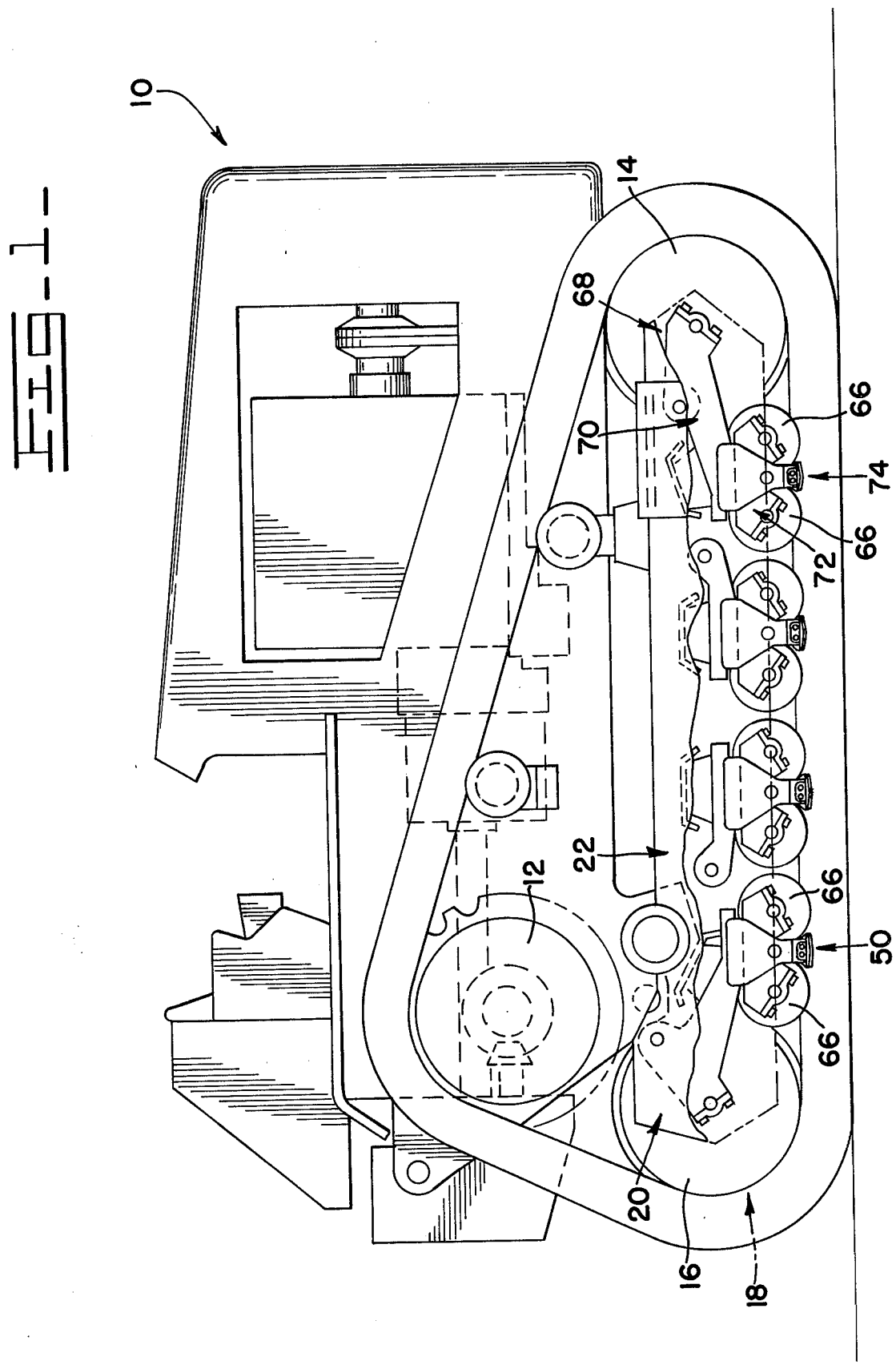

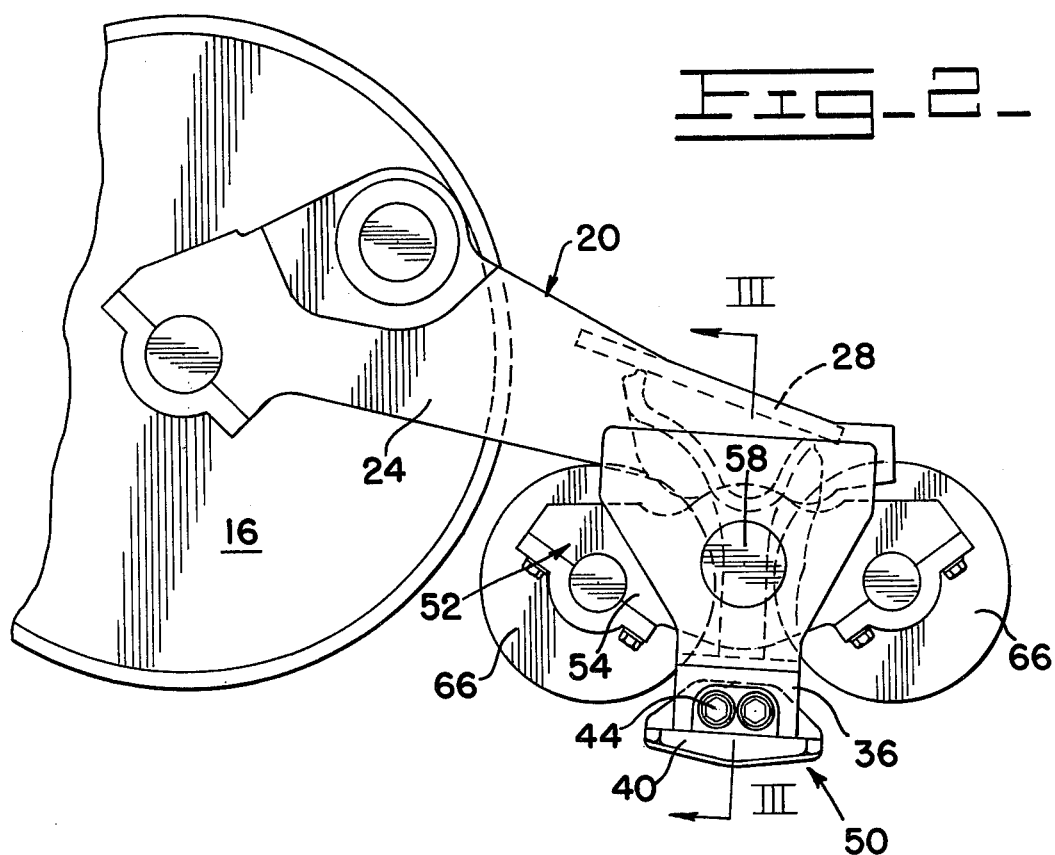
Fig-2-
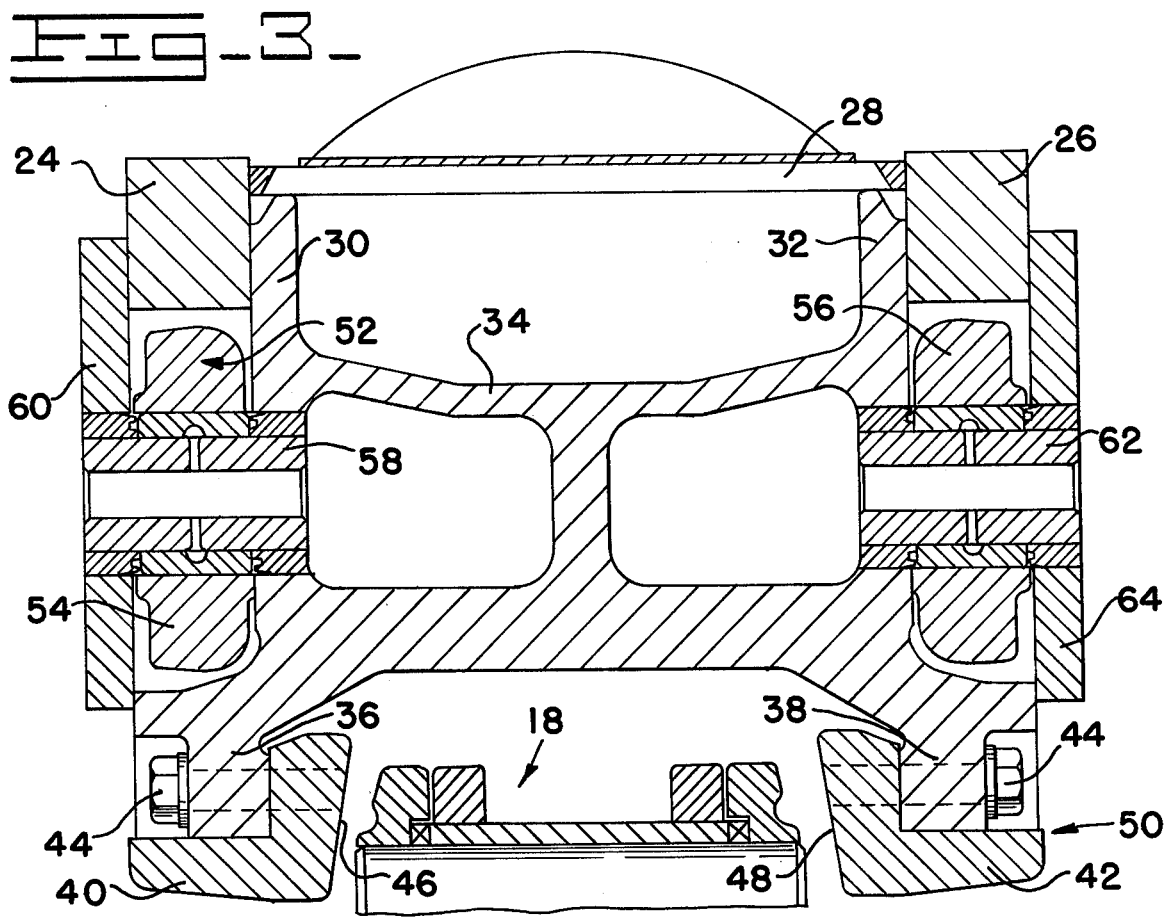
Fig-3-

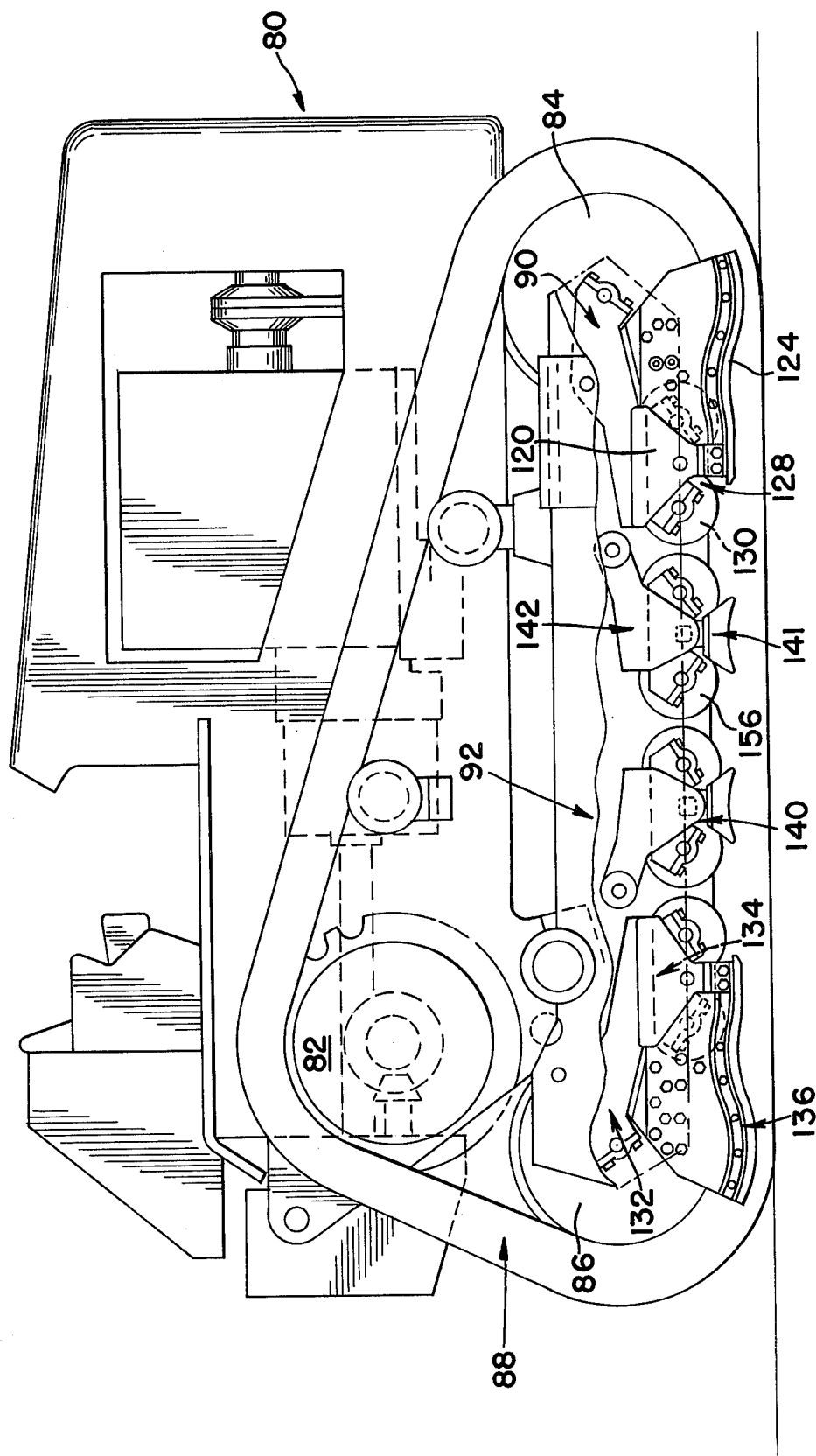

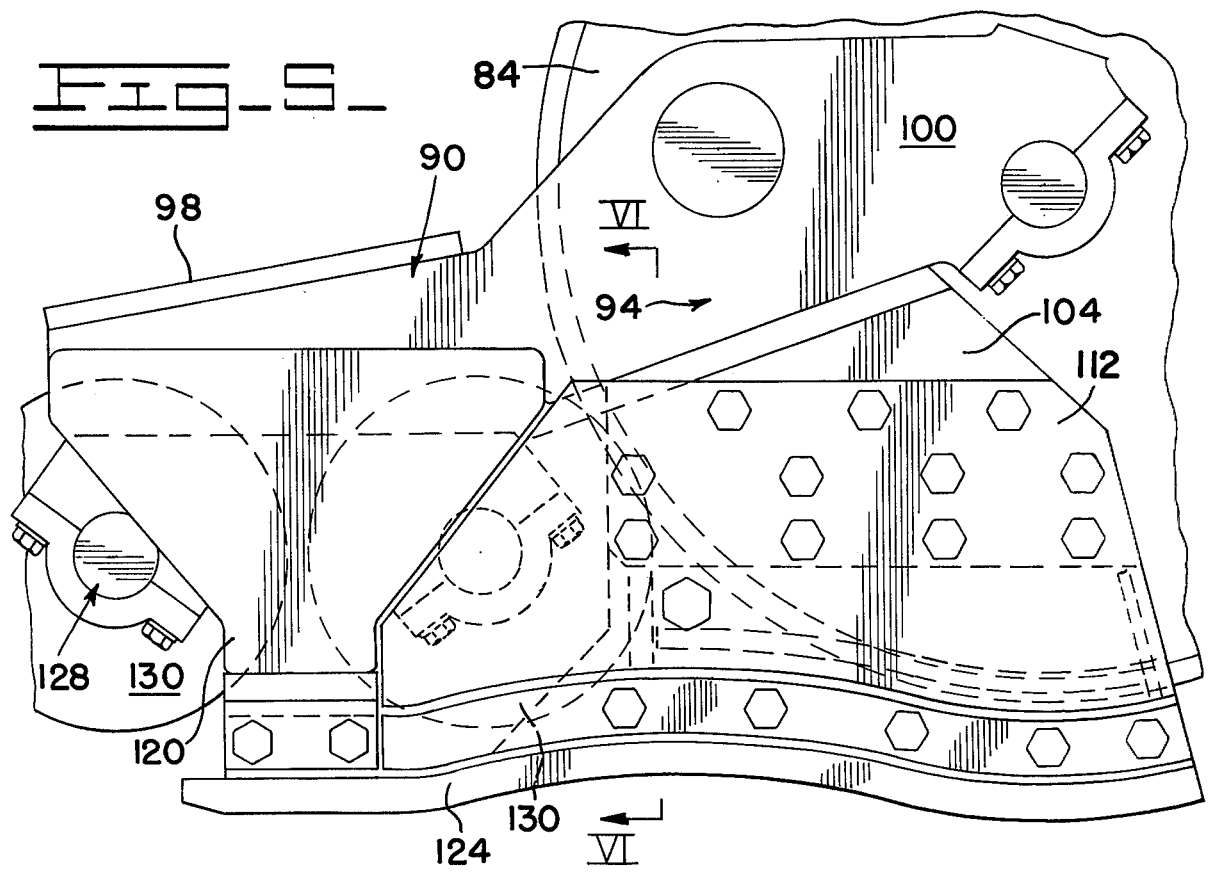
Fig_5_
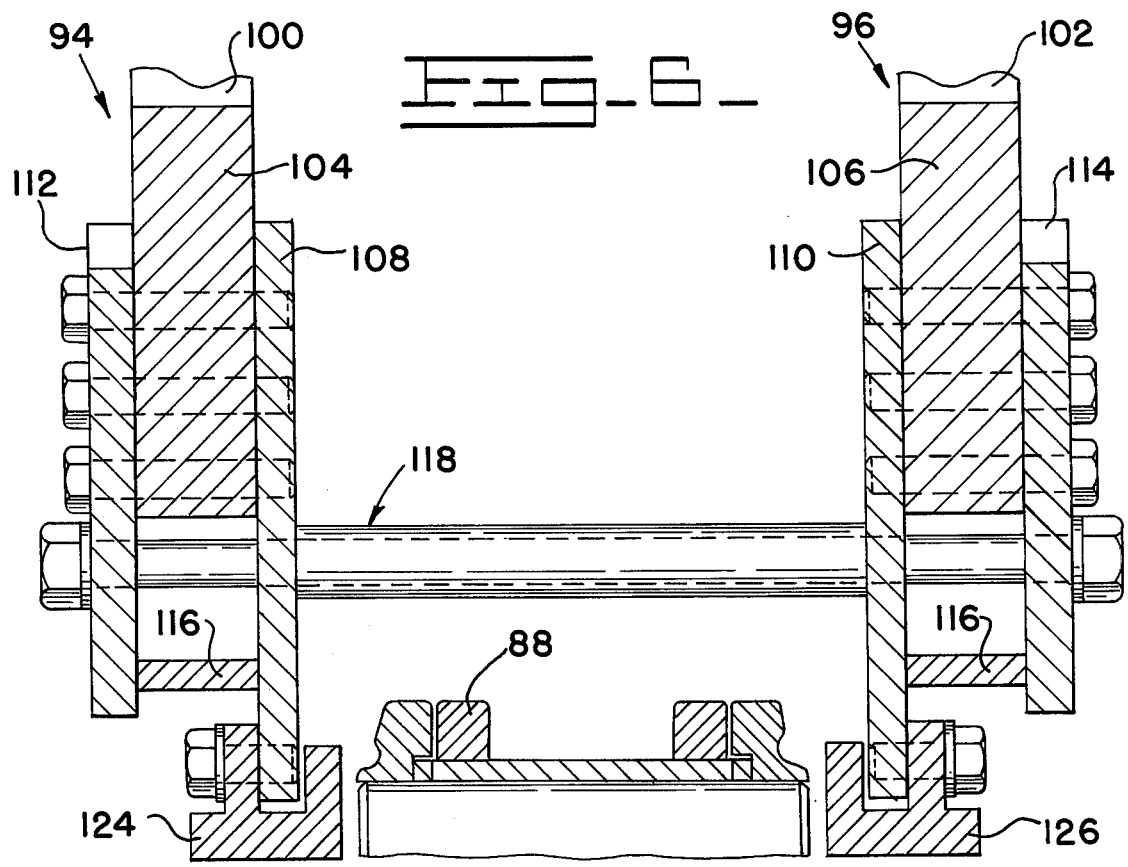
Fig_6_

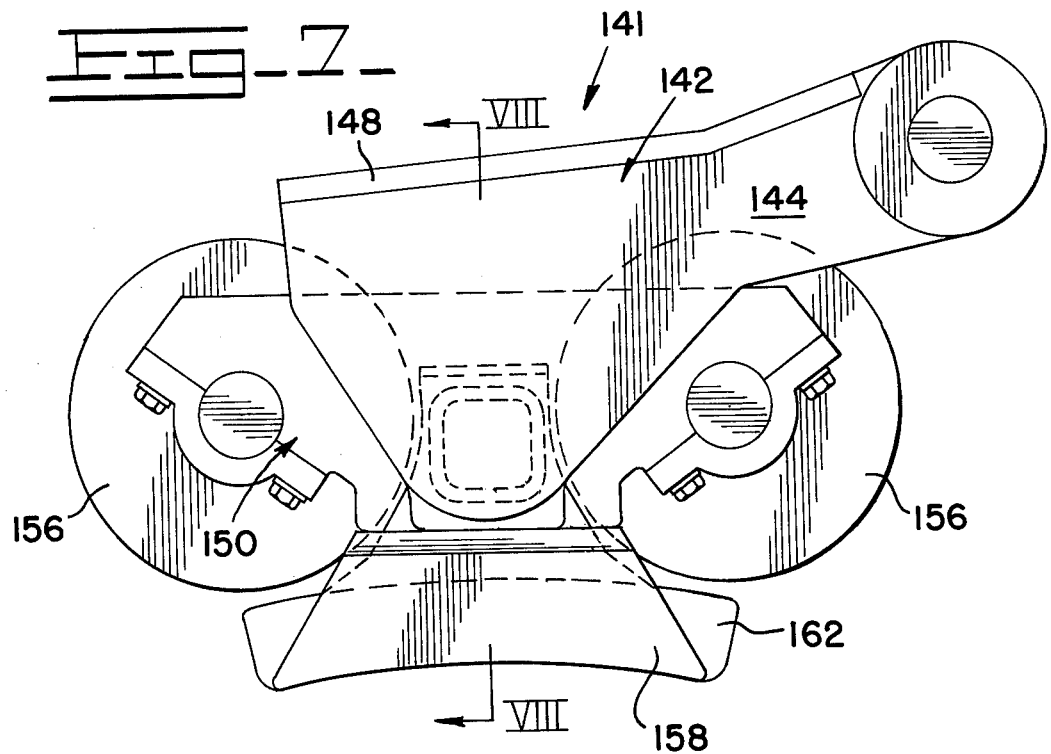
FIG-7-
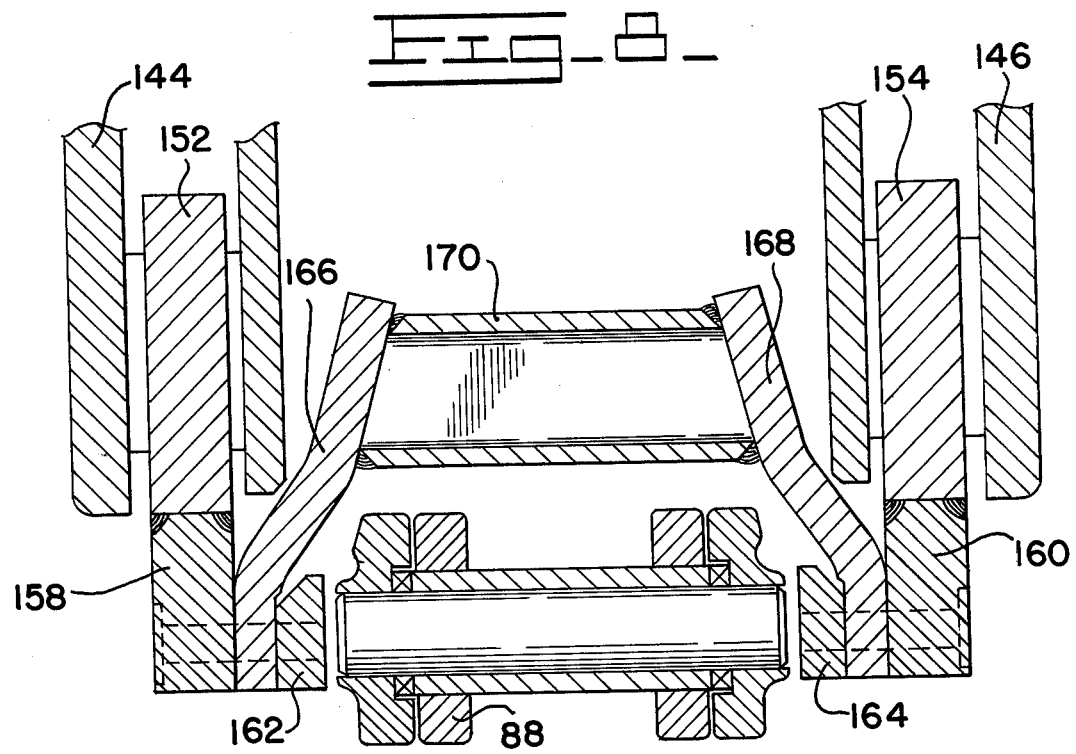
FIG-8-

TRACK GUIDING MEANS FOR A TRACK-TYPE VEHICLE

BACKGROUND OF THE INVENTION

This invention relates to guiding the tracks of a track-type vehicle.

In a conventional system, it is well known to provide rollers in rolling contact with the inner periphery of a track of a track-type vehicle, such rollers making up part of an overall vehicle suspension system. In general, such rollers define channels in their outer peripheries which engage with inwardly protruding portions of the track, so that the track tends to be laterally positioned relative to rollers as the track moves relative to the rollers. While such a system has proved relatively effective in operation, it is to be understood that under certain conditions, extremely high lateral loads are placed on the track, tending to force the track off the rollers, and it has been deemed desirable to provide some means for properly taking care of such lateral loads, meanwhile insuring that the track remains properly positioned relative to such rollers. Furthermore, when the vehicle spans a depression and the central portion of the track falls away from the rollers, it is important that means be included to insure that the track stay properly aligned. This is also true if the track tends to be twisted with respect to a roller when one edge of a track shoe encounters foreign material such as a rock or log.

U.S. Pat. No. 1,885,486 discloses rollers in rolling engagement with a track of a vehicle, with the rollers being mounted to guides which have portions extending on either side of a portion of the track. However, it is to be noted that the guides of U.S. Pat. No. 1,885,486 are pivotally interconnected, resulting in a limitation of overall operating efficiency of the suspension of the system of the vehicle. U.S. Pat. No. 2,418,610 discloses guard plates on either side of a portion of the track of a vehicle, but these guard plates are rigidly fixed to a track frame of the vehicle, so that even lower operating efficiency of the overall suspension system is achieved.

SUMMARY OF THE INVENTION

It is accordingly an object of this invention to provide apparatus for guiding movement of the track of a track-type vehicle which insures that the track is maintained on the rolling elements of the vehicle.

It is a further object of this invention to provide apparatus for guiding movement of the track of a track-type vehicle which, while fulfilling the above object, is extremely simple and efficient in design and operation.

It is a still further object of this invention to provide apparatus for guiding movement of the track of a track-type vehicle which, while fulfilling the above objects, provides for extremely efficient operation of the overall suspension system of the vehicle.

Broadly stated, the apparatus for guiding movement of the track of a track-type vehicle having a track frame comprises first arm means pivotally mounted relative to the track frame. Second arm means are pivotally mounted relative to the first arm means and are otherwise independent of the track frame. Roller means are rotatably mounted to the second arm means and are in rolling contact with the track of the vehicle. Guide means are mounted relative to one of the first arm means and second arm means and are positioned relative to the track to limit lateral movement of the track relative to the arm means to which the guide means are relatively mounted.

BRIEF DESCRIPTION OF THE DRAWINGS

These and other objects of the invention will become apparent from a study of the following specification and drawings in which:

FIG. 1 is a side elevation of a track-type tractor incorporating a first embodiment of the invention;

FIG. 2 is an enlarged view of a portion of the vehicle of FIG. 1;

FIG. 3 is a sectional view taken along the line III—III of FIG. 2;

FIG. 4 is a side elevation of a tractor incorporating second and third embodiments of the invention;

FIG. 5 is an enlarged view of a portion of the vehicle of FIG. 4;

FIG. 6 is a sectional view taken along the lines VI—VI of FIG. 5;

FIG. 7 is an enlarged view of another portion of the vehicle of FIG. 4; and

FIG. 8 is a sectional view taken along the lines VIII—VIII of FIG. 7.

DESCRIPTION OF THE PREFERRED EMBODIMENT

Shown in FIG. 1 is a track-type tractor 10 which includes a drive sprocket 12 raised above the ground level of the vehicle, front and rear idlers 14, 16, and a track 18 assembly entrained about the idlers 14, 16 and drive sprocket 12. The idler 16 is in fact rotatably mounted on an end of first arm means 20 pivotally mounted to the track frame 22 of the vehicle 10 (FIGS. 2 and 3).

The first arm means 20 (FIGS. 2 and 3) are made up of first and second link members 24, 26 rigidly interconnected by a plate 28 and pivotally mounted relative to the track frame 22. First plate means 30 are fixed to the link member 24, and second plate means 32 are fixed to the link member 26. Such first and second plate means 30, 32 are interconnected by brace means 34 running therebetween. The brace means 34 and plate means 30, 32 define downwardly extending portions 36, 38, to which are secured first and second elongated members 40, 42, by means of bolts 44. The first and second elongated members 40, 42 are positioned along either side of each endless link assembly of the track 18, as best shown in FIG. 3, and define surfaces 46, 48 angled outwardly in the direction of the track 18 most adjacent the opposite sides of the track 18 in straddling relationship therewith to act as guide means 50 therefor, actually being positioned to bear against the angled rail portions of the links of the track 18 (which are the normal wearing elements of the links).

Second arm means 52 are pivotally mounted relative to the first arm means 20, and otherwise are independent of the track frame 22. Such second arm means 52 are made up of first and second link members 54, 56 pivotally mounted relative to the arm means 20, the link member 54 actually being pivotable on a pin 58 secured to the plate means 30 and another plate 60 fixed to the first arm means 20 and plate means 30, the link member 56 being pivotable about a pin 62 mounted to the plate means 32 and yet another plate 64 secured to the arm means 20 and plate means 32. The link members 54, 56 have rollers 66 rotatably mounted thereon in rolling contact with the track of the vehicle 10. The link members 54, 56 are pivotable independently of each other.

It is to be understood that other systems in FIG. 1, for example, the system shown at 68, include similar first arm means 70 pivotally mounted relative to the track frame 22, second arm means 72 pivotally mounted relative to the first arm means 70 and otherwise independent of the track frame, and guide means 74 mounted relative to the first arm means 70. The guide means 50, 74 in FIG. 1 aid in providing lateral positioning of the track 18 relative to the track frame 22 and rolling components of the vehicle 10.

Referring to FIGS. 4–6, the vehicle 80 thereof again includes a raised drive sprocket 82, and front and rear idlers 84, 86 about which a track 88 is disposed. The forwardmost idler 84 is rotatably mounted on first arm means 90 which are pivotally mounted relative to the track frame 92. The arm means 90 include first and second link members 94, 96 rigidly connected together by a plate 98. The link members 94, 96 actually include respective upper portions 100, 102 and lower downwardly extending portions 104, 106 welded thereto. Bolted to the first link member 94 inwardly thereof is first plate means 108, and second plate means 110 is bolted to the second link member 96 inwardly thereof. Outer plates 112, 114 are also secured to the link members 94, 96, and rigid spacers 116 interconnect the plate 112 and plate means 108, and plate 114 and plate means 110, for strengthening thereof. A rigid brace 118 interconnects the first and second plate means 108, 110. Further included is a third plate means 120 welded to the first link member 94, and fourth plate means (not shown) welded to the second link member 96. The third plate means 120 is fixed adjacent the first plate means 108, and the fourth plate means is fixed adjacent the second plate means 110. The first and second plate means 108, 110 are in spaced-apart relation, and the third and fourth plate means are in spaced-apart relation. Elongated guide members 124, 126 are disposed on either side of the track 88, being positioned to be contacted by the pins connecting the track links. The elongated member 124 is bolted to the first plate means 108 and third plate means 120, and the elongated member 126 is bolted to the second plate means 110 and fourth plate means. Pivotally mounted to the third and fourth plate means by means of pin means are second arm means 128, such second arm means 128 thereby being pivotally mounted relative to the first arm means 90 and otherwise independent of the track frame 92. Rollers 130 are rotatably mounted on the second arm means 128, such rollers 130 being in rolling contact with the track 88 of the vehicle 80.

It is to be understood that the idler 86 is associated with first and second arm means 132, 134 and guide means 136 in substantially the same manner as the idler 84.

Between the idlers 84, 86 are included suspension means 140, 141 which are substantially identical in configuration and operation, as best shown in FIGS. 7 and 8. As shown therein, first arm means 142 are again pivotally mounted to the track frame 92, the first arm means 142 being made up of first and second link members 144, 146 rigidly connected by a plate 148. Second arm means 150 are also included, being made up of first and second link members 152, 154 pivotally mounted to the first and second link members 144, 146 of the arm means 142 by means of pin means. Rollers 156 are rotatably mounted on the link members 152, 154, and are in rolling contact with the track 88. First plate means 158 are welded to the link member 152 and extend downwardly therefrom, the second plate means 160 are welded to the link member 154 and extend downwardly therefrom. Bolted to the first and second plate means 158, 160 respectively are first and second elongated members 162, 164 which are positioned along either side of the track 88, being positioned to be contacted by the pins connecting the links of the track 88, as shown in FIG. 8. A first brace member 166 is also secured to the first plate means 158, extending upwardly and inwardly thereof, and a second brace member 168 is secured to the second plate means 160 extending inwardly and upwardly thereof. The elongated members 162, 164 are actually inward of portions of these brace members 166, 168, as shown in FIG. 8. A rigid tubular member 170 interconnects and is welded to the upwardly and inwardly extending portions of the brace members 166, 168.

It has been found that in all embodiments herein, highly effective positioning of the track relative to the track frame is achieved, even with extremely high lateral loads being placed on the track during operation of the vehicle.

What is claimed is:

1. Apparatus in combination with a track-type vehicle having a track frame and a track assembly mounted on the track frame, said apparatus comprising:
   first arm means mounted on the track frame for positioning said apparatus adjacent to the track assembly;
   second arm means pivotally mounted on the first arm means and otherwise independent of the track frame for pivoting relative to the first arm means;
   roller means rotatably mounted on the second arm means for engaging the track assembly in rolling contact; and
   guide means mounted on said first arm means and positioned in straddling relationship relative to a link assembly of the track assembly to limit lateral movement of the track assembly relative to the first arm means, said first arm means comprising first and second link members pivotally mounted on the track frame, and wherein the guide means comprise a first plate fixed to the first link member, a second plate fixed to the second link member, and first and second elongated members secured to the first and second plates and disposed along either side of the track assembly.

2. The apparatus of claim 1 wherein the guide means further comprise a third plate fixed to the first link member adjacent the first plate, a fourth plate fixed to the second link member adjacent the second plate, first and second elongated members being secured to the third and fourth plates.

3. The apparatus of claim 1 and further comprising a brace interconnecting the first and second plates.

4. The apparatus of claim 3 further comprising roller means rotatably mounted on the first arm means for engaging said track assembly.

5. Apparatus in combination with a track-type vehicle having a track frame and a track assembly mounted on the track frame, said apparatus comprising:
   first arm means mounted on the track frame for positioning said apparatus adjacent to the track assembly;
   second arm means pivotally mounted on the first arm means and otherwise independent of the track frame for pivoting relative to the first arm means;

roller means rotatably mounted on the second arm means for engaging the track assembly in rolling contact, and guide means mounted on said second arm means and positioned in straddling relationship relative to a link assembly of the track assembly to limit lateral movement of the track assembly relative to said second arm means, said second arm means comprising first and second link members pivotally mounted on said first arm means, and wherein the guide means comprise a first plate fixed to the first link member, a second plate fixed to the second link member, and first and second elongated members secured to the first and second plates and disposed along either side of the track assembly.

6. The apparatus of claim 5 further comprising a brace interconnecting the first and second plate means.

7. The apparatus of claim 6 wherein the brace comprises a first brace member secured to the first plate, a second brace member secured to the second plate, and a tubular member fixed to the first and second brace members.

8. Apparatus in combination with a track-type vehicle having a track frame and a track assembly mounted on the track frame, said apparatus comprising:

arm means mounted on said track frame, comprising first and second link members, for positioning said apparatus adjacent to the track assembly;

roller means rotatably mounted on the arm means for engaging the track assembly in rolling contact therewith;

guide means mounted on the arm means and positioned relative to the track assembly to limit lateral movement of track assembly relative to the arm means, the guide means comprising a first plate fixed to the first link member, a second plate fixed to the second link member, a third plate fixed to the first link member adjacent the first plate, a fourth plate fixed to the second link member adjacent the second plate, a first elongated member being secured to the first and third plates, and a second elongated member being secured to the second and fourth plates, the first and second elongated members being disposed along either side of the track assembly.

9. The apparatus of claim 8 further comprising a brace interconnecting the first and second plate means.

10. Apparatus in combination with a track-type vehicle having a track frame and a track assembly mounted on the track frame, said apparatus comprising:

arm means mounted on said track frame, comprising first and second link members for positioning said apparatus adjacent to the track assembly;

roller means rotatably mounted on the arm means for engaging the track assembly in rolling contact with said track assembly;

guide means mounted on the arm means and positioned relative to the track assembly to limit lateral movement of track assembly relative to the arm means, the guide means comprising a second plate fixed to the second link member, and first and second elongated members secured to the first and second plates along either side of the track assembly; and brace means interconnecting the first and second plate means comprising a first brace member secured to the first plate, a second brace member secured to the second plate, and a tubular member fixed to the first and second brace members.

* * * * *

UNITED STATES PATENT OFFICE
CERTIFICATE OF CORRECTION

Patent No. 4,097,093　　　　　　　　　Dated June 27, 1978

Inventor(s) Robert L. Shelby, James T. Duke & Duane L. Parker

It is certified that error appears in the above-identified patent and that said Letters Patent are hereby corrected as shown below:

At Column 6, line 25, between "comprising" and "a" insert
--first plate means fixed to the first link member--.

Signed and Sealed this

Sixteenth Day of September 1980

[SEAL]

Attest:

SIDNEY A. DIAMOND

Attesting Officer　　　Commissioner of Patents and Trademarks